United States Patent
Mair

(10) Patent No.: US 8,666,620 B2
(45) Date of Patent: Mar. 4, 2014

(54) METHOD FOR CONTROLLING AN AUTOMATED GEARED TRANSMISSION

(75) Inventor: Roland Mair, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 432 days.

(21) Appl. No.: 13/132,684

(22) PCT Filed: Nov. 16, 2009

(86) PCT No.: PCT/EP2009/065205
§ 371 (c)(1),
(2), (4) Date: Jun. 3, 2011

(87) PCT Pub. No.: WO2010/076078
PCT Pub. Date: Jul. 8, 2010

(65) Prior Publication Data
US 2011/0237393 A1  Sep. 29, 2011

(30) Foreign Application Priority Data

Dec. 17, 2008  (DE) .................. 10 2008 054 802

(51) Int. Cl.
*G06F 7/00* (2006.01)
*G06F 17/00* (2006.01)
*G06F 19/00* (2011.01)

(52) U.S. Cl.
USPC .................. 701/56; 701/54; 701/55

(58) Field of Classification Search
USPC .......... 701/54, 55, 56, 84, 110; 123/486, 492, 123/559.1; 60/278, 280, 598
See application file for complete search history.

(56) References Cited

U.S. PATENT DOCUMENTS

| | | | |
|---|---|---|---|
| 6,278,915 B1* | 8/2001 | Deguchi et al. ................ 701/22 |
| 6,754,574 B2* | 6/2004 | Tokura et al. .................. 701/67 |
| 7,010,417 B2* | 3/2006 | Edwards et al. ............. 701/110 |
| 7,247,126 B2* | 7/2007 | Shim et al. .................... 477/148 |
| 8,282,531 B2* | 10/2012 | Ishido et al. ................. 477/110 |
| 8,321,108 B2* | 11/2012 | Tona et al. ..................... 701/68 |
| 8,423,251 B2* | 4/2013 | Hartmann et al. ............ 701/54 |
| 8,554,430 B2* | 10/2013 | Vandekerkhove ............ 701/55 |
| 2007/0278021 A1 | 12/2007 | Pott et al. |
| 2008/0093141 A1* | 4/2008 | Muta et al. ................. 180/65.4 |
| 2009/0143191 A1* | 6/2009 | Hubbard ....................... 477/43 |
| 2012/0209482 A1* | 8/2012 | Busdiecker et al. .......... 701/54 |
| 2013/0245903 A1* | 9/2013 | Hubbard et al. .............. 701/54 |

FOREIGN PATENT DOCUMENTS

DE  10 2005 013 697 A1  9/2006
(Continued)

*Primary Examiner* — Stephen K Cronin
*Assistant Examiner* — Joseph Dallo
(74) *Attorney, Agent, or Firm* — Davis & Bujold, PLLC; Michael J. Bujold

(57) ABSTRACT

A method of controlling an automated stepped transmission disposed in a drive train of a motor vehicle in conjunction with a turbo-charged internal combustion engine. In which the control of start-up and shifting procedures depends on the response behavior of the internal combustion engine. In order to enable control of the start-up and shifting processes with considerably lower coordination effort, the actual response behavior of the internal combustion engine is taken from an engine dynamics characteristic map in which the immediately available maximum torque ($M_{max}$) of the internal combustion engine is stored as a function of the current engine torque ($M_M$) and the current engine speed ($n_M$, thus ($M_{max}=f(M_M, n_M)$).

17 Claims, 3 Drawing Sheets

(56) References Cited

FOREIGN PATENT DOCUMENTS

| DE | 10 2005 044 828 A1 | 3/2007 |
| DE | 10 2006 009 589 A1 | 9/2007 |
| DE | 10 2006 019 031 A1 | 10/2007 |
| EP | 1 255 031 A2 | 11/2002 |
| EP | 1 439 330 A2 | 7/2004 |

* cited by examiner

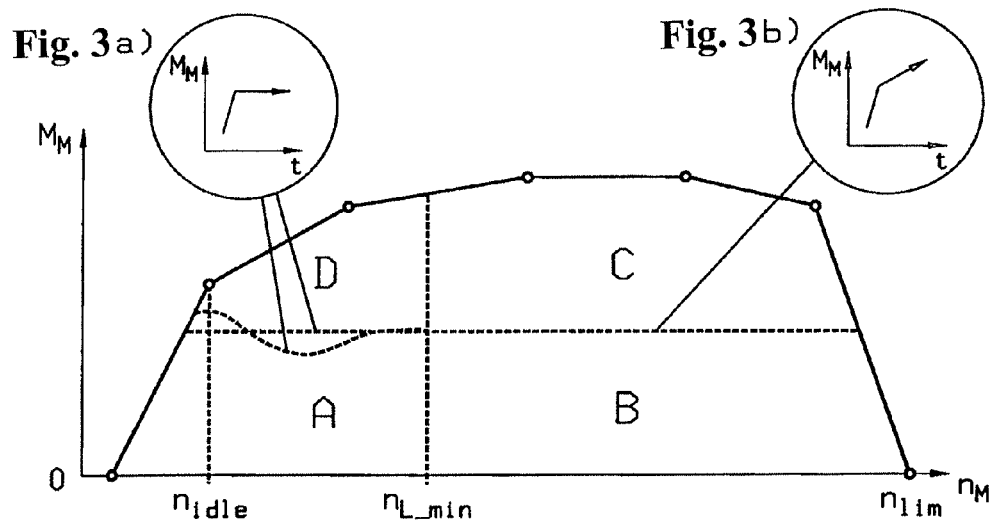
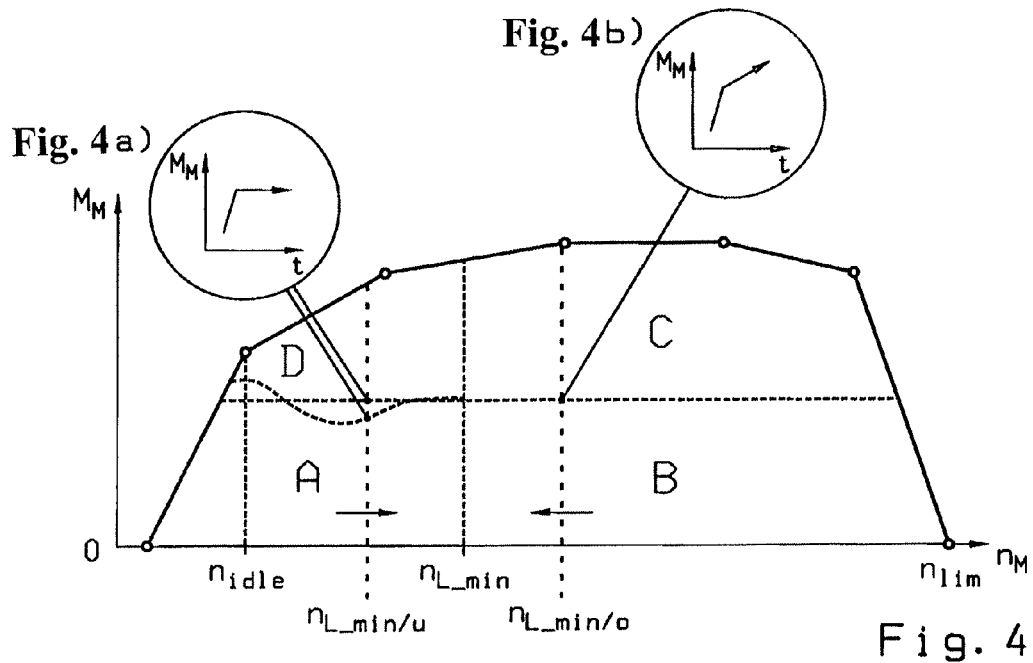

METHOD FOR CONTROLLING AN AUTOMATED GEARED TRANSMISSION

This application is a National Stage completion of PCT/EP2009/065205 filed Nov. 16, 2009, which claims priority from German patent application serial no. 10 2008 054 802.2 filed Dec. 17, 2008.

FIELD OF THE INVENTION

The invention relates to a method for controlling an automated stepped transmission that is disposed in a drive train of a motor vehicle in conjunction with a turbo-charged internal combustion engine, wherein the control of start-up and shifting processes depends on the response behavior of the internal combustion engine.

BACKGROUND OF THE INVENTION

A turbo-charged internal combustion engine is understood to be an internal combustion engine with an exhaust gas turbo-charger. An exhaust gas turbo-charger is mainly composed of a turbine disposed in an exhaust system of the internal combustion engine and a compressor disposed in the intake system of the internal combustion engine, which are both connected together via the drive shaft. The turbine is driven by the exhaust gas flow of the internal combustion engine, and for its part, drives the compressor via the drive shaft, by means of which the combustion air of the internal combustion engine is compressed, thereby increasing the charging pressure of the internal combustion engine. This leads to increased cylinder filling, and with it, to increased performance of the internal combustion engine. Therefore, the performance of an existing internal combustion engine can be increased in a relatively simple manner by means of an exhaust gas turbo-charger. Likewise, the pollutant emissions of an internal combustion engine of a specific engine-power class can be reduced by using a smaller, i.e. smaller cylinder capacity basic engine, in conjunction with an exhaust gas turbo-charger.

With the use as a drive motor in a motor vehicle, however, the frequent changes of engine speed negatively affect the operating behavior of a turbo-charged internal combustion engine. It is particularly disadvantageous that in the case of the driver requesting, through an appropriate actuation of the gas pedal, an increase of the engine performance at low engine speeds, initially the internal combustion engine must be accelerated above the boost threshold speed so that due to an increased exhaust gas flow, the compressor of the exhaust gas turbo-charger is driven by the turbine with such an increased rotational speed, so that an increased charging pressure is generated, thereby resulting in the desired increase in engine performance. The effect of the exhaust gas turbo-charger begins only above the boost threshold speed.

Below the boost threshold speed, a spontaneous increase of the engine torque and with it the engine performance is possible only up to an intake torque that the internal combustion engine can generate in the intake operation maximally for a short period, i.e. without an increase of the charging pressure by the exhaust gas turbo-charger. This functional interaction is particularly evident in a delayed response during start-up and acceleration procedures of such a motor vehicle and a relatively low engine power of the internal combustion engine, which is generally designated as turbo lag.

This effect can also have negative impact during sudden upshifting when the speed of the internal combustion engine during a shift, for matching the coupling speed, is reduced so far that after completion of the shift, due to a reduced speed of the compressor of the exhaust gas turbo-charger, the charging pressure is so low that at the end of the shift, a significantly reduced engine power of the internal combustion engine is available, and with it a lower ability to accelerate the motor vehicle.

To avoid or at least mitigate the undesired turbo lag in the past, multiple solutions were proposed and some were even implemented, such as an adjustable turbine geometry for improving the response behavior of the exhaust gas turbo-charger, or auxiliary devices for increasing the charging pressure at low engine speed, for instance a mechanically drivable compressor, an electrically drivable supplemental compressor, or a mechanical or electrical drive of the drive shaft of the exhaust gas turbo-charger. Such devices are, however, relatively complex and expensive, increase the construction space requirements and represent increased failure potential for the operation of the internal combustion engine, so that they are frequently omitted.

Due to the effects of the dynamic operating characteristics of a turbo-charged internal combustion engine on the entire drive train, these must be considered particularly with the control of the start-up and shift procedures. With the use of an automated stepped transmission, such as an automatic transmission that can be connected to the drive shaft of the internal combustion engine by means of a single automated friction clutch, or an automated double clutch transmission that can be alternately connected to the drive shaft of the internal combustion engine by means of two friction clutches, specific control procedures, such as determining the start-up gear and the drive speed with a start-up procedure, determining the shiftable gears in an incline, and the control of a friction clutch during the start-up and drive shifting procedures, thus depend also on the load build-up potential of the respective internal combustion engine, generally designated as a response behavior.

Because applicable information is not immediately available, i.e., cannot be transmitted by an engine control device of the internal combustion engine to the transmission control device of the stepped transmission via a data line or a CAN data bus, the dynamic operational characteristics of an internal combustion engine have up to now been considered only implicitly with the clutch and shift control of an automated stepped transmission, that is, by a corresponding design of the associated characteristic maps and characteristic curves for controlling the stepped transmissions. This procedure is, however, disadvantageously connected with a high coordination effort, which is necessary again even with a minor change of the engine characteristics of the internal combustion engine, which can result for example from adapting the engine control to tighter exhaust gas limit values.

SUMMARY OF THE INVENTION

Based on this background, the object of the present invention is to propose a method for controlling an automated stepped transmission in a drive train of a motor vehicle together with a turbo-charged internal combustion engine, with which it is possible to control the start-up and shifting procedures depending on the response behavior of the internal combustion engine, with significantly lower coordination effort.

The solution of this objective consists of the actual response behavior of the internal combustion engine is taken from an engine dynamics characteristic map in which the immediately available maximum torque $M_{max}$ of the internal combustion engine is stored as a function of the current engine torque $M_M$ and the current engine speed $n_M$; thus $(M_{max}=f(M_M, n_M))$.

Accordingly, the invention proceeds from an automated stepped transmission that is disposed in a drive train of a motor vehicle in conjunction with a turbo-charged internal combustion engine. The start-up and shifting procedures, particularly the engagement procedure of an associated friction clutch and the selection and engagement of a start-up gear with a start-up procedure or a target gear with a sudden upshift, are controlled by the transmission control device in a known manner depending on the response behavior of the internal combustion engine that in contrast to the prior art is not implicitly embodied in the characteristic maps and characteristic curves for controlling the friction clutch and the stepped transmission, rather, according to the invention is taken from an engine dynamics characteristic map in which at least the immediately available maximum torque $M_{max}$ of the internal combustion engine is stored as a function of the current engine torque $M_M$ and the current engine speed $n_M$; thus $(M_{max}=f(M_M, n_M))$.

As a result of this, the coordination effort for determining or adapting the characteristic map and characteristic curves of the transmission control typically required up to now with a change of the engine control of the internal combustion engine is no longer required. For adapting the transmission control to the changed dynamic operating properties of the internal combustion engine, now only a replacement or an adaptation of the engine dynamic characteristic map of the transmission control is necessary, which represents a significantly reduced effort and offers fewer possible sources for errors.

Control procedures, for instance determining the start-up gear and the start-up speed for a start-up procedure, or determining the shiftable gears before a sudden upshift, now occur also depending on the maximum torque $M_{max}$ of the internal combustion engine which can be immediately available based on the current engine torque $M_M$ and the current engine speed $n_M$.

It is also advantageous to store the maximum torque gradient $(dM_M/dt)_{max}$ with which the immediately available maximum torque $M_{max}$ of the internal combustion engine can be attained as quickly as possible, in the engine dynamic characteristic map as a function of the current engine torque $M_M$ and the current engine speed $n_M$, thus $((dM_M/dt)_{max}=f(M_M, n_M))$, because with this, the information about the largest possible speed of the charge increase or the shortest possible period for attaining the maximum torque $M_{max}$ is available as a control parameter.

For limiting the quantity of data, the engine dynamic characteristic map is expediently limited by the steady-state full load torque characteristic curve $M_{VL}(n_M)$, the zero load torque characteristic curve $(M_M=0)$, the idle speed $n_{idle}$ and the cut-off speed $n_{lim}$ of the internal combustion engine, because these operating limits cannot be exceeded in normal driving operation.

Within these operating limits, depending on the desired resolution, now any number of values of the maximum torque $M_{max}$ and the maximum torque gradient $(dM_M/dt)_{max}$ of the internal combustion engine, together with the current engine torque $M_M$ and the current engine speed $n_M$, can be stored as parameters in the engine dynamic characteristic map. Characteristic curves and characteristic values of a turbo-charged internal combustion engine lying within these operating limits, for instance the intake torque characteristic curve $M_S(n_M)$, up to which a spontaneous increase of the engine torque $M_M$ is possible without increase of the charging pressure, and the boost threshold speed $n_{L\_min}$, from which point on, the charging pressure increases due to the exhaust gas turbo-charger are then implicitly contained in the stored values of the maximum torque $M_{max}$ and the maximum torque gradient $(dM_M/dt)_{max}$.

For reducing the quantity of data by using characteristic values, which are valid over a range for the maximum torque $M_{max}$ and/or the maximum gradient $(dM_M/dt)_{max}$ of the internal combustion engine, it is also expedient to subdivide the engine dynamic characteristic map by intake torque characteristic curve $M_S(n_M)$ and the boost threshold speed $n_{L\_min}$ of the internal combustion engine into four regions (A, B, C, D), specifically into a first region A $(0 \leq M_M < M_S(n_M), n_{idle} \leq n_M < n_{L\_min})$ lying beneath the intake torque characteristic curve $M_S(n_M)$ and beneath the boost threshold speed $n_{L\_min}$, the immediately available maximum torque $M_{max}(n_M)$ of the internal combustion engine is formed by the corresponding values of the intake torque $M_S(n_M)$ where $(M_{max}(n_M)=M_S(n_M))$, and can be attained with a high maximum torque gradient $(dM_M/dt)_{max}$, into a second region B $(0 \leq M_M < M_S(n_M), n_{L\_min} \leq n_M \leq n_{lim})$ lying beneath the intake torque characteristic curve $M_S(n_M)$ and above the boost threshold speed $n_{L\_min}$, the immediately available maximum torque $M_{max}(n_M)$ of the internal combustion engine is formed by the corresponding values of the intake torque $M_S(n_M)$ where $(M_{max}(n_M)=M_S(n_M))$, and can be attained with a high maximum torque gradient $(dM_m/dt)_{max}$, into a third region C $(M_S(n_M) \leq M_M < M_{VL}(n_M), n_{L\_min} \leq n_M \leq n_{lim})$, adjoining the second region B, above the intake torque characteristic curve $M_S(n_M)$ and above the boost threshold speed $n_{L\_min}$, in which a further increase of the engine torque $M_M$ is possible with a lower torque gradient $(dM_M/dt)_{max}$ up to the respective value of the steady-state full load torque characteristic curve $M_{VL}(n_M)$, into a fourth region D $(M_S(n_M) \leq M_M < M_{VL}(n_M), n_{idle} \leq n_M < n_{L\_min})$, adjoining at the first region A, above the intake torque characteristic curve $M_S(n_M)$ and beneath the boost threshold speed $n_{L\_min}$, in which a further rapid increase of the engine torque $M_M$ is not possible without an increase of the engine speed torque $n_M$ above the boost threshold speed $n_{L\_min}$.

To avoid an accelerated reduction of the engine torque $M_M$, and with it, to avoid stalling the internal combustion engine when the engine speed $n_M$ approaches the idle speed $n_{idle}$ under a high engine load, the intake torque characteristic curve $M_S(n_M)$ is frequently lowered above the idle speed $n_{idle}$, and increased near the idle speed $n_{idle}$ by appropriate intervention in the engine control so that in the case of approaching the idle speed $n_{idle}$ a torque increase results, counteracting a stalling of the internal combustion engine. This has the consequence, however, that the value of the maximum torque $M_{max}$ that is valid in this partial region, which is formed in the first region A by the respective value of the intake torque $M_S(n_M)$, is not constant, but rather forms a function $(M_{max}=f(n_M))$ that depends on the engine speed $n_M$.

Generally, the intake torque characteristic curve $M_S(n_M)$ of the internal combustion engine in the engine dynamic characteristic map cannot, however, be approximated by a straight line with constant intake torque ($M_S$=const.), so that at least in the first regions of the engine dynamic characteristic maps (A, B) in each case a single immediately available maximum torque $M_{max}$ of the internal combustion engine and a single maximum torque gradient $(dM_M/dt)_{max}$ can be used for most rapidly attaining the maximum torque $M_{max}$.

Within the scope of an application of the transmission control at the transmission manufacturer, the characteristic values of the engine dynamic characteristic map ($M_{max}=f(M_M, n_M)$, $(dM_M/dt)_{max}=f(M_M, n_M)$) and/or the partitioning curves or partitioning values ($M_S(n_M)$, $n_{L\_min}$) of the engine dynamic characteristic map and/or the limiting curves or limiting values ($M_{VL}(n_M)$, $n_{idle}$, $n_{lim}$) of the engine dynamic characteristic map can be determined for a specific vehicle type or a specific vehicle variant, and can be transferred into the data store for a transmission control device for the vehicle type or the vehicle variant concerned. This is problematic, however, when the respective stepped transmission is installed into another vehicle type or vehicle variant, i.e., it is combined with another internal combustion engine, or if the engine tuning of the correct internal combustion engine had been changed in the intervening period.

Therefore, it is more advantageous if the characteristic values of the engine dynamic characteristic map ($M_{max}=f(M_M, n_M)$, $(dM_M/dt)_{max}=f(M_M, n_M)$) and/or the partitioning curves or partitioning values ($M_S(n_M)$, $n_{L\_min}$) of the engine dynamic characteristic map and/or the limit curves or limit values ($M_{VL}(n_M)$, $n_{idle}$, $n_{lim}$) of the engine dynamic characteristic map are transmitted into the data storage of the transmission control device by vehicle manufacturer only at the end of the assembly line, because this largely guarantees the use of the correct, current values in the engine dynamic characteristic map.

However, it is also possible that the characteristic values of the engine dynamic characteristic map ($M_{max}=f(M_M, n_M)$, $(dM_M/dt)_{max}=f(M_M, n_M)$) and/or the partitioning curves or partitioning values ($M_S(n_M)$, $n_{L\_min}$) of the engine dynamic characteristic map and/or the limit curves or limit values ($M_{VL}(n_M)$, $n_{idle}$, $n_{lim}$) of the engine dynamic characteristic map are transmitted from the engine control device into the data storage of the transmission control device during the first start-up of a motor vehicle at the vehicle manufacturer or during a repair-dependent restart-up of the motor vehicle at a service workshop. This results in guaranteeing the use of the correct and current values in the engine dynamic characteristic map. This assumes that the appropriate values are available in the engine control device or can be derived from the characteristics values present there.

A further possibility for determining the current data of the engine dynamic characteristic map consists in that the characteristic values of the engine dynamic characteristic map ($M_{max}=f(M_M, n_M)$, $(dM_M/dt)_{max}=f(M_M, n_M)$) and/or the partitioning curves or partitioning values ($M_S(n_M)$, $n_{L\_min}$) of the engine dynamic characteristic map and/or the limiting curves or limiting values ($M_{VL}(n_M)$, $n_{idle}$, $n_{lim}$) are captured at the vehicle manufacturer during the first start-up of a motor vehicle, by driving through the specified load build-up sequences in an activated learning mode of the stepped transmission, and are transferred into the data storage of the operational control device, or are used for adapting the starting values stored in the data store. This has the advantage that the data of the engine dynamic characteristic map corresponds to the actual operating state of the internal combustion engine, i.e., a variance of the power output that is present in series production of internal combustion engines, and is permissible within limits, is automatically recorded and therefore considered.

Performing the specified load build-up sequences with an activated learning mode of the transmission control device for determining characteristic values and/or partitioning curves or partitioning values and/or limit curves or limit values of the engine dynamic characteristic map, occurs either in a real drive operation on a test track or in a simulated drive operation on a chassis dynamometer.

The characteristic values of the engine dynamic characteristic map ($M_{max}=f(M_M, n_M)$, $(dM_M/dt)_{max}=f(M_M, n_M)$) and/or the partitioning curves or partitioning values ($M_S(n_M)$, of the engine dynamic characteristic map and/or the limit curves or limit values ($M_{VL}(n_M)$, $n_{idle}$, $n_{lim}$) of the engine dynamic characteristic map, can be recorded however, also in normal driving operation of a motor vehicle by driving through suitable load build-up sequences, and can be used for adapting the values present in the data store. In this manner, the data of the engine dynamic characteristic map is automatically adapted to age-related and wear-related changes of the power output of an internal combustion engine.

For determining or adapting the intake characteristic curve $M_S(n_M)$ of the internal combustion engine, it is preferable that starting from an engine torque lying below the intake torque ($M_M<M_S(n_M)$) with a completely engaged drive train, the engine torque $M_M$ is increased with a high torque gradient $dM_M/dt>>0$, until a discontinuous descent of the torque gradient $dM_M/dt$ is detected, and that the value of the engine torque $M_M$ at the discontinuity of the engine gradient $dM_M/dt$ is recorded and stored as a valid value of the intake torque characteristic curve $M_S(n_M)$, or used for adapting the intake torque characteristic curve $M_S(n_M)$.

For determining or adapting a maximum torque gradient $(dM_M/dt)_{max}$ for attaining the maximum torque $M_{max}$ as fast as possible, it is expediently provided that at a target torque $M_{soll}$ that is significantly above the current torque $M_M$, the torque gradient $dM_M/dt$ that is set outside of the active operating limits is recorded, and is stored as a valid value of the maximum torque gradient $(dM_M/dt)_{max}$, or is used for adapting the maximum torque gradient $(dM_M/dt)_{max}$. The target torque $M_{soll}$ is the engine torque requested by the driver by actuation of the gas pedal, or by the transmission control device.

For determining or adapting the boost threshold speed $n_{L\_min}$ of the internal combustion engine, a lower boost threshold speed $n_{L\_min/u}$ that lies safely below the actual boost threshold speed $n_{L\_min}$ is defined and corrected upwards, when the engine torque $M_M$ at the respective motor speed is increased with a high torque gradient $dM_m/dt>>0$ from an engine torque lying below the intake torque ($M_M<M_S(n_M)$) until a discontinuous decrease of the of the torque gradient $dM_M/dt$ to zero is detected, and that an upper boost threshold speed $n_{L\_min/o}$ lying safely above the actual boost threshold speed $n_{L\_min}$ is defined and corrected downwards, when the engine torque $M_M$ at the respective engine speed is increased with a high torque gradient $dM_M/dt>>0$ from an engine torque lying below the intake torque ($M_M<M_S(n_M)$) until a discontinuous decrease of the torque gradient $dM_M/dt$ at a value greater than zero, and that one of the two boost threshold speeds ($n_{L\_min/u}$, $n_{L\_min/o}$) or the average value of the two is set as the sought after boost threshold speed $n_{L\_min}$, or is used for adapting the boost threshold speed $n_{L\_min}$, when the lower boost threshold speed $n_{L\_min/u}$ and the upper boost threshold speed $n_{L\_min/o}$ coincide within a specified tolerance threshold.

However, the boost threshold speed $n_{L\_min}$ of the internal combustion engine can be determined or adapted in the following manner, in that in an operational situation with a drive resistance torque ($M_{FW}<M_S(n_M)$) lying below the intake torque $M_S(n_M)$ and a target torque $M_{soll}$ lying above the intake torque $M_S(n_M)$, that is ($M_{soll}>M_S(n_M)$), starting with an operating point with an engine torque $M_M$ lying below the intake torque $M_S(n_M)$, that is ($M_M(t0)<M_S(n_M)$), and an engine speed $n_M$ lying below the boost threshold speed $n_{L\_min}$, that is ($n_M(t0)<n_{L\_min}$), under a moderate increase of the engine speed $n_M$, initially, the engine torque $M_M$ is increased up to the intake torque $M_S(n_M)$ (t1 to t2) and next, the engine torque $M_M$ is further increased above the intake torque $M_S(n_M)$, and that the engine speed $n_M$ at the point in time (t3) of the engine torque $M_M$ exceeding the intake torque $M_S(n_M)$, is set as the sought after boost threshold speed $n_{L\_min}$ or is used for adapting the boost threshold speed $n_{L\_min}$.

The drive resistance torque $M_{FW}$ is the effective load torque at the input shaft of the stepped transmission, resulting from the current drive resistance with the gear engaged that is to be applied by the internal combustion engine, and that must lie at least marginally below the respective value of the intake torque $M_S(n_M)$ for enabling an acceleration; that is ($M_{FW}<M_S(n_M)$). An acceleration beyond the boost threshold speed $n_{L\_min}$ that is necessary for detecting the boost threshold speed $n_{L\_min}$, and a subsequent increase of the engine torque $M_M$ above the intake torque $M_S(n_M)$, is enabled by a target torque $M_{soll}$ above the intake torque $M_S(n_M)$, that is ($M_{soll}>M_S(n_M)$).

If a functioning boost pressure sensor is available, that is, is disposed in the intake system behind the compressor of the exhaust gas turbo-charger, it is expediently used for determining or adapting the boost threshold speed $n_{L\_min}$ of the internal combustion engine that, in an operating situation with a drive resistance torque $M_{FW}$ lying below the intake torque $M_S(n_M)$, thus ($M_{FW}<M_S(n_M)$), and a target torque $M_{soll}$ lying above the intake torque $M_S(n_M)$, thus ($M_S(n_M)$), starting with an operating point with an engine torque $M_M$ lying below the intake torque $M_S(n_M)$, thus ($M_M<M_S(n_M)$), and an engine sped $n_M$ lying below the boost threshold speed $n_{L\_min}$, thus ($n_M<n_{L\_min}$), under a moderate increase of the engine speed $n_M$, initially, the engine torque $M_M$ is increased up to the intake torque $M_S(n_M)$, and subsequently the engine toque $M_M$ is further increased above the intake torque $M_S(n_M)$, and that the engine speed $n_M$ at the point in time of a recorded increase of the boost pressure is set as the sought after boost threshold speed $n_{L\_min}$, or is used for adapting the boost threshold speed $n_{L\_min}$.

Because appropriate load build-up sequences with a start-up from a very low start-up speed or with a sudden upshift with a very low target speed are, in most cases, prevented by appropriate operating limits in the engine control or transmission control, it can be necessary that an operating limit that may be present is temporarily deactivated in order to avoid a high engine torque $M_M$ with a low engine speed $n_M$ near the idle speed $n_{idle}$.

BRIEF DESCRIPTION OF THE DRAWINGS

For illustrating the invention, the description is accompanied by drawings of embodiment examples. They show.

DETAILED DESCRIPTION OF THE PREFERRED EMBODIMENTS

Figure 1:
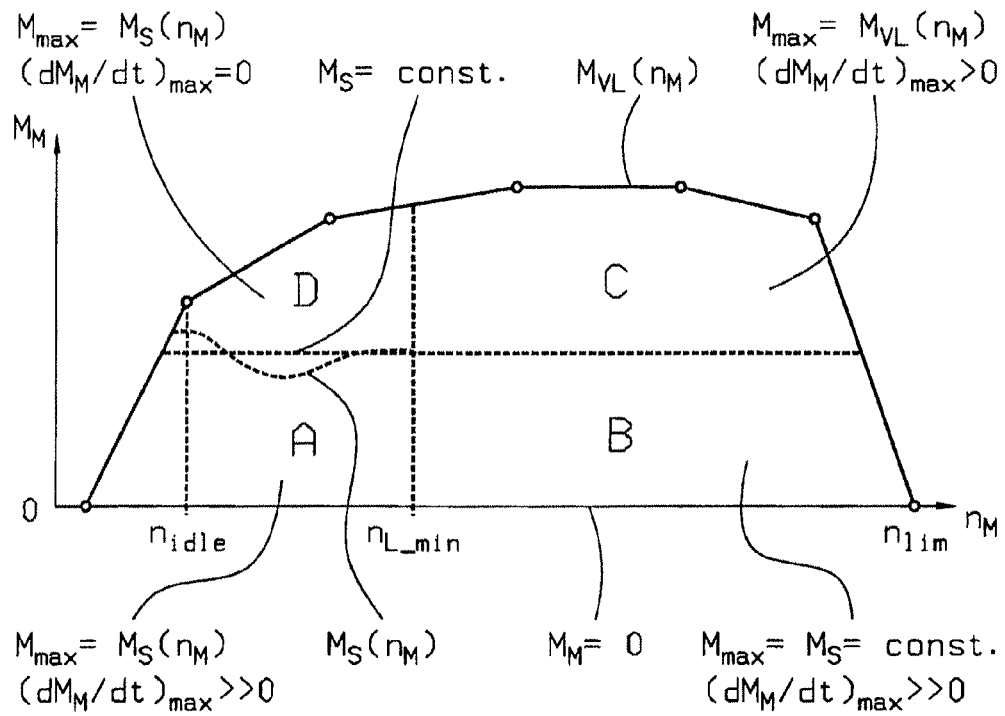
FIG. 1 a first embodiment of an engine dynamic characteristic map in a torque/speed diagram, FIG. 2 a second embodiment of an engine dynamic characteristic map in a torque/speed diagram, FIGS. 3, 3a, 3b an illustration of the determination of the intake torque characteristic curve in a torque/speed diagram according to FIG. 1, FIGS. 4, 4a, 4b an illustration of a first determination of the boost threshold speed in a torque/speed diagram according to FIG. 1, and FIGS. 5a, 5b an illustration of a second determination of the boost threshold speed in a torque/speed diagram.

An engine dynamic characteristic map according to FIG. 1 that is used for controlling the start-up and shift procedures of an automated stepped transmission depending on the response behavior of a turbo-charged internal combustion engine, contains the immediately available maximum torque $M_{max}$ of the internal combustion engine and the maximum torque gradient $(dM_M/dt)_{max}$, with which the immediately available maximum torque $M_{max}$ of the internal combustion engine can be attained as fast as possible, in each case as a function of the current engine torque $M_M$ and the current engine speed $n_M$, thus ($M_{max}=f(M_M, n_M)$, $(dM_M/dt)_{max}=f(M_M, n_M)$).

The engine dynamic characteristic map is bounded by the steady-state full load torque characteristic curve $M_{VL}(n_M)$, the zero torque curve ($M_M=0$), the idle speed $n_{idle}$ and the cut-off speed $n_{lim}$ of the internal combustion engine. The engine dynamic characteristic map is subdivided into four regions A, B, C, D by the intake torque characteristic curve $M_S(n_M)$ and the boost threshold speed $n_{L\_min}$ of the internal combustion engine.

In the first region A ($0 \leq M_M < M_S(n_M)$, $n_{idle} \leq n_M < n_{L\_min}$) that is below the intake torque characteristic curve $M_S(n_M)$ and below the boost threshold speed $n_{L\_min}$, the immediately available maximum torque $M_{max}(n_M)$ of the internal combustion engine is formed in each case by the corresponding value of the intake torque $M_S(n_M)$; thus ($M_{max}(n_M)=M_S(n_M)$).

To avoid stalling the internal combustion engine, in the range of the idle speed $n_{idle}$ the intake torque characteristic curve $M_S(n_M)$ is frequently lowered above the idle speed $n_{idle}$, and increased near the idle speed $n_{idle}$, resulting in a torque increase nearing the idle speed $n_{idle}$. However, if the intake torque $M_S$ in this range is constant ($M_S$=const.), the immediately available maximum torque $M_{max}$ of the internal combustion engine can also be represented by a single value ($M_{max}=M_S$=const.). Independent of this, the very high maximum torque gradient in this region $(dM_M/dt)_{max}$ within region A can also be expressed by a single value.

In the second region B ($0 \leq M_M < M_S(n_M)$, $n_{L\_min} \leq n_M \leq n_{lim}$) lying below the intake torque characteristic curve $M_S(n_M)$ and above the boost threshold speed $n_{L\_min}$, the immediately available maximum torque $M_{max}(n_M)$ of the internal combustion engine is similarly given in each case by the corresponding value of the intake torque $M_S(n_M)$. Because the intake torque $M_S$ in this range is in most cases a constant ($M_S$=const.), the immediately available maximum torque $M_{max}$ of the internal combustion engine is represented in region B by a single value ($M_{max}=M_S$=const.). As with region A, also in region B the very high maximum torque gradient $(dM_M/dt)_{max}$ beneath the intake torque characteristic curve $M_S(n_M)$ can also be expressed by a single value.

In the third region C ($M_S(n_M) \leq M_M < M_{VL}(n_M)$, $n_{L\_min} \leq n_M \leq n_{lim}$), adjacent to region B, and lying above the intake torque characteristic curve $M_S(n_M)$ and above the boost threshold speed $n_{L\_min}$, a further increase of the engine torque $M_M$ is possible up to the respective value of the steady-state full load torque characteristic curve $M_{VL}(n_M)$, however, with a significantly lower maximum torque gradient $(dM_M/dt)_{max}$ than in the regions A and B, i.e., below the intake torque characteristic curve $M_S(n_M)$.

In the fourth region D ($M_S(n_M) \leq M_M < M_{VL}(n_M)$, $n_{idle} \leq n_M < n_{L\_min}$), adjoining at the first region A, above the intake torque characteristic curve $M_S(n_M)$ and below the boost threshold speed $n_{L\_min}$, a further rapid increase of the engine torque $M_M$ is not possible without an increase of the engine speed $n_M$ above the boost threshold speed $n_{L\_min}$. As a consequence, in region D the immediately available maximum torque $M_{max}(n_M)$ of the internal combustion engine equals the corresponding value of the intake torque $M_S(n_M)$, thus ($M_{max}(n_M)=M_S(n_M)$ or $M_{max}=M_S$=const.), and the maximum torque gradient $(dM_M/dt)_{max}$ is equal to zero, thus $((dM_M/dt)_{max}=0)$.

Subdividing the engine dynamic characteristic map into four regions A to D, permits the region-wise use of a single value for the immediately available maximum torque $M_{max}(n_M)$ and the maximum torque gradient $(dM_M/dt)_{max}$ of the internal combustion engine, which as a result can reduce the quantity of data, and can save storage space.

However, it is also possible to forgo the represented subdivision of the engine dynamic characteristic map. In this case the values of the immediately available maximum torque $M_{max}(n_M)$ and the maximum torque gradient $(dM_M/dt)_{max}$ are stored as a function of the current engine torque $M_M$ and the current engine speed $n_M$ in an appropriately parameterized data field ($M_{max}=f(M_M, n_M)$, $(dM_M/dt)_{max}=f(M_M, n_M)$).

Figure 2:
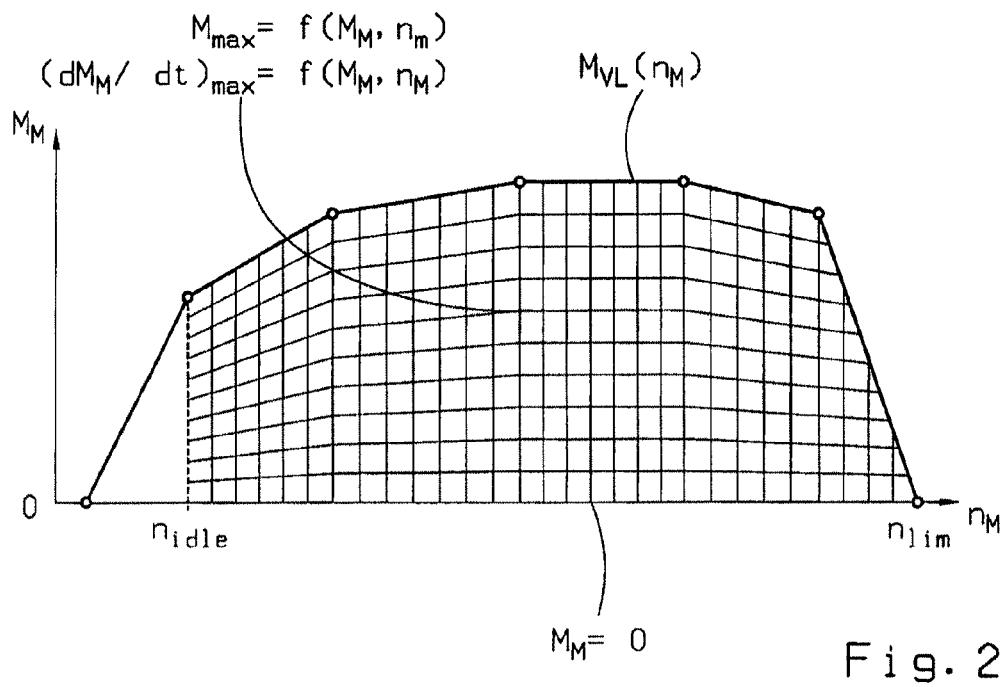

This is illustrated for example by the engine dynamic characteristic map in FIG. 2, by the subdivision lines drawn within the boundary lines ($M_{VL}(n_M)$, $M_M=0$, $n_{idle}$, $n_{lim}$), where for each node point an appropriate value is stored for the immediately available maximum torque $M_{max}(n_M)$ and a value for the maximum torque gradient $(dM_M/dt)_{max}$ of the internal combustion engine. The intake torque characteristic curve $M_S(n_M)$ that as a matter of principle is always effective with a turbo-charged internal combustion engine, and the also effective boost threshold speed $n_{L\_min}$, are in this case implicitly contained in the stored values for the immediately available maximum torque $M_{max}(n_M)$ and the maximum torque gradient $(dM_M/dt)_{max}$.

FIG. 3 illustrates how values for the intake torque characteristic curve $M_S(n_M)$ can be determined for determining the intake torque characteristic curve for the first time, or for the adapting of an existing intake torque characteristic curve. For this purpose, with a completely engaged drive train, starting with an engine torque ($M_M<M_S(n_M)$) lying below the intake torque, the engine torque $M_M$ is increased with a high torque gradient $dM_M/dt>>0$ until a discontinuous decrease of the torque gradient $dM_M/dt$ is detected. When this discontinuity is below the boost threshold speed ($n_M<n_{L\_min}$), the torque gradient $dM_M/dt$, upon attaining the intake torque characteristic curve $M_S(n_M)$, drops abruptly to zero, which is shown in a greatly simplified manner in the torque progression $M_M(t)$ in FIG. 3a). When this occurs at or above the boost threshold speed ($n_M \geq n_{L\_min}$), the torque gradient $dM_M/dt$, upon exceeding the intake torque characteristic curve $M_S(n_M)$, jumps abruptly to a positive, but significantly lower value, which is represented in a very simplified torque progression $M_M(t)$ in FIG. 3b). Thus, the respective value of the engine torque $M_M$, at the occurrence of the discontinuity of the torque gradient $dM_M/dt$, is a value of the intake torque characteristic curve $M_S(n_M)$ and, therefore is stored as a valid value or is used for adapting the intake torque characteristic curve $M_S(n_M)$.

For determining or adapting the boost threshold speed $n_{L\_min}$ of the internal combustion engine, a lower boost threshold speed $n_{L\_min/u}$, lying safely above the actual boost threshold speed $n_{L\_min}$, is defined and corrected upwards, when the engine torque $M_M$ at the respective motor speed is increased with a high torque gradient $dM_M/dt>>0$ from an engine torque lying below the intake torque ($M_M<M_S(n_M)$), until a discontinuous decrease of the torque gradient $dM_M/dt$ to zero is detected, which is illustrated in FIG. 4 by the torque progression $M_M(t)$ in FIG. 4a).

In addition, an upper boost threshold speed $n_{L\_min/o}$ lying safely above the actual boost threshold speed $n_{L\_min}$ is defined and corrected downwards, when the engine torque $M_M$ at the respective engine speed is increased with a high torque gradient $dM_m/dt>>0$ from an engine torque lying below the intake torque ($M_M<M_S(n_M)$), until a discontinuous decrease of the torque gradient $dM_M/dt$ at a value greater than zero is detected, which is illustrated in FIG. 4 by the torque progression $M_M(t)$ in FIG. 4b). In this case, one of the two boost threshold speeds ($n_{L\_min/u}$, $n_{L\_min/o}$) or the average value of the two is set as the sought after boost threshold speed $n_{L\_min}$, is used for adapting the boost threshold speed $n_{L\_min}$, when the lower boost threshold speed $n_{L\_min/u}$ and the upper boost threshold speed $n_{L\_min/o}$ agree within a specified tolerance threshold.

Figure 5A:
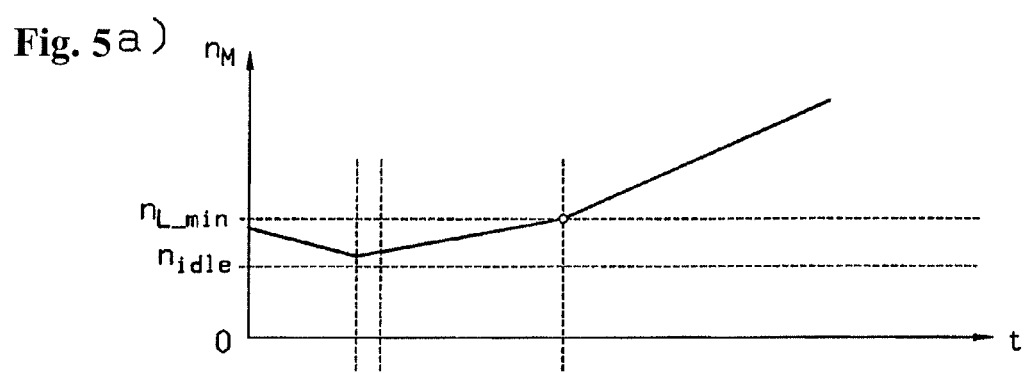
Figure 5B:
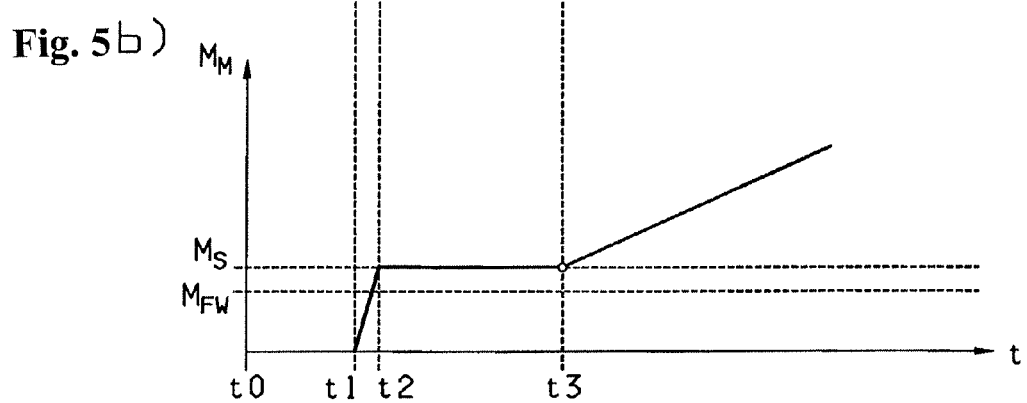

FIG. 5a, 5b illustrate another method for determining the boost threshold speed $n_{L\_min}$ of the internal combustion engine, in that in an operational situation with a drive resistance torque lying below the intake torque $M_S(n_M)$, thus ($M_{FW}<M_S(n_M)$), and a target torque $M_{soll}$ lying above the intake torque $M_S(n_M)$, thus ($M_{soll}>M_S(n_M)$), starting with an operating point with an engine torque $M_M$ lying below the intake torque $M_S(n_M)$, thus ($M_M(t0)<M_S(n_M)$), and an engine speed $n_M$ lying below the boost threshold speed $n_{L\_min}$, thus ($n_M(t0)<n_{L\_min}$), under a moderate increase of the engine speed $n_M$, initially the engine torque $M_M$ is increased up to the intake torque $M_S(n_M)$ (t1 to t2), and next, the engine torque $M_M$ is further increased above the intake torque $M_S(n_M)$.

With the relatively slow intended acceleration, the engine torque $M_M$, upon attaining the intake torque at the point in time t2, remains initially at this value (t2 to t3) during further increase of the engine speed $n_M$, because the engine speed $n_M$ still lies below the boost threshold speed $n_{L\_min}$, thus ($n_M<n_{L\_min}$). After attaining the boost threshold speed $n_{L\_min}$ at point in time t3, under further increase of the engine speed $n_M$, the engine torque $M_M$ then again increases.

As a consequence, at point in time t3, with the engine torque $M_M$ exceeding the intake torque $M_S$, the engine speed $n_M$ is set as the sought after boost threshold speed $n_{L\_min}$ or is used for adapting the boost threshold speed $n_{L\_min}$. As a result, an acceleration beyond the boost threshold speed $n_{L\_min}$ that is necessary for detecting the boost threshold speed $n_{L\_min}$, and a subsequent increase of the engine torque $M_M$ above the intake torque $M_S(n_M)$, is made possible by a target torque $M_{soll}$ lying above the intake torque $M_S(n_M)$, thus ($M_{soll}>M_S(n_M)$).

This manner of determining the boost threshold speed $n_{L\_min}$ of the internal combustion engine can be performed in the scope of the start-up procedure or a sudden upshift, wherein it can be necessary to temporarily deactivate an operating limit that is possibly present in the engine control or transmission control for avoiding a high engine torque $M_M$ at low engine speeds $n_M$ near the idle speed $n_{idle}$.

REFERENCE CHARACTERS

A region
B region
C region
D region
M torque
$M_{FW}$ drive resistance torque
$M_M$ engine torque
$M_{max}$ maximum torque
$M_S$ intake torque
$M_{soll}$ target torque
$M_{VL}$ full load torque
n speed of rotation
$n_{idle}$ idle speed of rotation
$n_{lim}$ cut-off speed
$n_{L\_min}$ boost threshold speed $n_{L\_min/o}$ upper boost threshold speed
$n_{L\_min/u}$ lower boost threshold speed
$n_M$ engine speed
t time
t0 point in time
t1 point in time
t2 point in time
t3 point in time

The invention claimed is:

1. A method of controlling an automated stepped transmission that disposed in a drive train of a motor vehicle in conjunction with a turbo-charged internal combustion engine, with start-up and shifting procedures being controlled depending on a response behavior of the internal combustion engine, the method comprising the steps of:

taking a current response behavior of the internal combustion engine, in each case, from an engine dynamic characteristic map, in which an immediately available maximum torque ($M_{max}$) of the internal combustion engine is stored as a function of current engine torque ($M_M$) and current engine speed ($n_M$; $M_{max}=f(M_M, n_M)$); and defining the engine dynamic characteristic map by a steady-state full load torque characteristic curve ($M_{VL}(n_M)$), a zero torque curve ($M_M=0$), an idle speed ($n_{idle}$) and a cut-off speed ($n_{lim}$) of the internal combustion engine.

2. The method according to claim 1, further comprising the step of storing a maximum torque gradient $(dM_M/dt)_{max}$, with which the immediately available maximum torque ($M_{max}$) of the internal combustion engine is attained, in the engine dynamic characteristic map as a function of the current engine torque ($M_M$) and the current engine speed ($n_M$; $(dM_M/dt)_{max}=f(M_M, n_M)$).

3. The method according to claim 1, further comprising the step of subdividing the engine dynamic characteristic map into first, second, third and fourth regions (A, B, C, D) by an intake torque characteristic curve ($M_S(n_M)$) and a boost threshold speed ($n_{L\_min}$) of the internal combustion engine;

having the first region (A; $0 \leq M_M < M_S(n_M)$, $n_{idle} \leq n_M < n_{L\_min}$) lie beneath the intake torque characteristic curve ($M_S(n_M)$) and beneath the boost threshold speed ($n_{L\_min}$), in which the immediately available maximum torque ($M_{max}(n_M)$) of the internal combustion engine is formed by corresponding values of the intake torque ($M_S(n_M)$; $M_{max}(n_M)=M_S(n_M)$), and is attainable with a high maximum torque gradient $((dM_M/dt)_{max})$, having the second region (B; $0 \leq M_M < M_S(n_M)$, $n_{L\_min} \leq n_M \leq n_{lim}$) lie beneath the intake torque characteristic curve ($M_S(n_M)$) and above the boost threshold speed ($n_{L\_min}$) in which the immediately available maximum torque ($M_{max}(n_M)$) of the internal combustion engine is similarly formed in each case by the corresponding values of the intake torque ($M_S(n_M)$; $M_{max}(n_M)=M_S(n_M)$), and is attainable with the high maximum torque gradient $((dM_M/dt)_{max})$, having the third region (C; $M_S(n_M) \leq M_M < M_{VL}(n_M)$, $n_{L\_min} \leq n_M \leq n_{lim}$), adjoin the second region (B), above the intake torque characteristic curve ($M_S(n_M)$) and above the boost threshold speed ($n_{L\_min}$), in which a further increase of the engine torque ($M_M$) is possible with a lower torque gradient $((dM_M/dt)_{max})$ up to a respective value of the steady-state full load torque characteristic curve ($M_{VL}(n_M)$), having the fourth region (D; $M_S(n_M) \leq M_M < M_{VL}(n_M)$, $n_{idle} \leq n_M < n_{L\_min}$), adjoin the first region (A), above the intake torque characteristic curve ($M_S(n_M)$) and beneath the boost threshold speed ($n_{L\_min}$), in which a further rapid increase of the engine torque ($M_M$) is not possible without an increase of the engine speed (nM) above the boost threshold speed ($n_{L\_min}$).

4. The method according to claim 3, further comprising the step of approximating the intake torque characteristic curve ($M_S(n_M)$) of the internal combustion engine in the engine dynamic characteristic map by a straight line with constant intake torque ($M_S$=const.), and at least in the first and the second regions (A, B) of the engine dynamic characteristic maps, in each case, using at least one of a single immediately available maximum torque ($M_{max}$) of the internal combustion engine and a single maximum torque gradient $((dM_M/dt)_{max})$ to most rapidly attain the maximum torque $((M_{max}))$.

5. The method according to claim 1, further comprising the step of determining characteristic values of at least one of the engine dynamic characteristic map ($M_{max}=f(M_M, n_M)$, $(dM_M/dt)_{max}=f(M_M, n_M)$) and either partitioning curves or partitioning values ($M_S(n_M)$, $n_{L\_min}$) of the engine dynamic characteristic map and either limiting curves or limiting values ($M_{VL}(n_M)$, $n_{idle}$, $n_{lim}$) of the engine dynamic characteristic map at a vehicle manufacturer for either a specific vehicle type or a specific vehicle variant, and transferring the characteristic values into a data storage of a transmission control device for either the vehicle type or the vehicle variant concerned.

6. The method according to claim 1, further comprising the step of transmitting characteristic values of at least one of the engine dynamic characteristic map ($M_{max}=f(M_M, n_M)$, $(dM_M/dt)_{max}=f(M_M, n_M)$) and either partitioning curves or partitioning values ($M_S(n_M)$, $n_{L\_min}$) of the engine dynamic characteristic map and either limiting curves or limiting values ($M_{VL}(n_M)$, $n_{idle}$, $n_{lim}$) of the engine dynamic characteristic map into a data storage of a transmission control device of a motor vehicle at a vehicle manufacturer at an end of an assembly line.

7. The method according to claim 1, further comprising the step of transmitting characteristic values of at least one of the engine dynamic characteristic map ($M_{max}=f(M_M, n_M)$, $(dM_M/dt)_{max}=f(M_M, n_M)$) and either partitioning curves or partitioning values ($M_S(n_M)$, $n_{L\_min}$) of the engine dynamic characteristic map and either limiting curves or limiting values ($M_{VL}(n_M)$, $n_{idle}$, $n_{lim}$) of the engine dynamic characteristic map from an engine control device into a data storage of a transmission control device during either a first start-up of a motor vehicle at a vehicle manufacturer or during a repair-dependent restart-up of the motor vehicle at a service workshop.

8. The method according to claim 1, further comprising the step of determining characteristic values of at least one of the engine dynamic characteristic map ($M_{max}=f(M_M, n_M)$, $(dM_M/dt)_{max}=f(M_M, n_M)$) and either partitioning curves or partitioning values ($M_S(n_M)$, $n_{L\_min}$) of the engine dynamic characteristic map and either limiting curves or limiting values ($M_{VL}(n_M)$, $n_{idle}$, $n_{lim}$) of the engine dynamic characteristic map at a vehicle manufacturer during a first start-up of a motor vehicle, by driving through specified load build-up sequences in an activated learning mode of the stepped transmission, and either transferring the characteristic values into a data storage of a transmission control device, or using the characteristic values for adapting starting values stored in the data store.

9. The method according to claim 8, further comprising the step of performing the specified load build-up sequences in an activated learning mode of the transmission control device for at least one of determining the characteristic values and either the partitioning curves or the partitioning values and either the limiting curves or the limiting values of the engine dynamic characteristic map in a driving operation on a test track.

10. The method according to claim 8, further comprising the step of performing the specified load build-up sequences in an activated learning mode of the transmission control device for at least one of determining the characteristic values and either the partitioning curves or the partitioning values and either the limiting curves or the limiting values of the engine dynamic characteristic map in a simulated driving operation on a chassis dynamometer.

11. The method according to claim 1, further comprising the step of recording characteristic values of at least one of an engine dynamic characteristic map ($M_{max}=f(M_M, n_M)$, $(dM_M/dt)_{max}=f(M_M, n_M)$) and either a partitioning curve or a partitioning values ($M_S(n_M)$, $n_{L\_min}$) of the engine dynamic characteristic map and either the limit curves or limit values ($M_{VL}(n_M)$, $n_{idle}$, $n_{lim}$) of the engine dynamic characteristic map, in normal driving operation of a motor vehicle by performing suitable load build-up sequences, and using the characteristic values for adapting values present in a data store.

12. The method according to claim 3, further comprising the step of either determining or adapting the intake characteristic curves ($M_S(n_M)$) of the internal combustion engine, with a completely engaged drive train, starting from an engine torque ($M_M<M_S(n_M)$) lying below the intake torque, by increasing the engine torque ($M_M$) with a high torque gradient ($dM_M/dt\gg 0$), until a discontinuous descent of the torque gradient ($dM_M/dt$) is detected, and either recording and storing the value of the engine torque ($M_M$) at the discontinuity of the engine gradients ($dM_M/d$) as a valid value of the intake torque characteristic curve ($M_S(n_M)$), or using the value of the engine torque ($M_M$) at the discontinuity of the engine gradients ($dM_M/d$) for adapting the intake torque characteristic curve ($M_S(n_M)$).

13. The method according to claim 3, further comprising the step of either determining or adapting a maximum torque gradient (($dM_M/dt)_{max}$) for attaining the maximum torque ($M_{max}$), at a target torque ($M_{soll}$) lying significantly above the current engine torque ($M_M$), by either recording and storing the torque gradient ($dM_M/dt$) set outside of active operating limits as a valid value of the maximum torque gradient (($dM_M/dt)_{max}$), or using the torque gradient ($dM_M/dt$) set outside of active operating limits as a valid value of the maximum torque gradient (($dM_M/dt)_{max}$) for adapting the maximum torque gradient (($dM_M/dt)_{max}$).

14. The method according to claim 3, further comprising the step of either determining or adapting the boost threshold speed ($n_{L\_min}$) of the internal combustion engine, in which a lower boost threshold speed ($n_{L\_min/u}$) that lies safely below the actual boost speed ($n_{L\_min}$) is defined and corrected upwards when the engine torque ($M_M$) at the respective motor speed is increased with a high torque gradient ($dM_M/dt\gg 0$) from an engine torque ($M_M<M_S(n_M)$) lying below an intake torque, until a discontinuous decrease of the torque gradient ($dM_M/dt$) to zero is detected, and an upper boost threshold speed ($n_{L\_min/o}$), lying above the actual boost threshold speed ($n_{L\_min}$), is defined and corrected downwards when the engine torque ($M_M$) at the respective engine speed is increased with a high torque gradient ($dM_M/dt\gg 0$) from an engine torque ($M_M<M_S(n_M)$) lying below the intake torque until a discontinuous decrease of the torque gradient ($dM_M/dt$) at a value greater than zero is detected, and one of the lower and the upper boost threshold speeds ($n_{L\_min/u}$, $n_{L\_min/o}$) or an average value of the lower and the upper boost threshold speeds ($n_{L\_min/u}$, $n_{L\_min/o}$) is either set as the sought after boost threshold speed ($n_{L\_min}$), or is used for adapting the boost threshold speed ($n_{L\_min}$), when the lower boost threshold speed ($n_{L\_min/u}$) and the upper boost threshold speed ($n_{L\_min/o}$) agree within a specified tolerance threshold.

15. The method according to claim 3, further comprising the step of either determining or adapting the boost threshold speed ($n_{L\_min}$) of the internal combustion engine in which in an operational situation with a drive resistance torque ($M_{FW}$) lying below the intake torque ($M_S(n_M)$, $M_{FW}<M_S(n_M)$), and a target torque ($M_{soll}$) lying below the intake torque ($M_S(n_M)$, $M_{soll}>M_S(n_M)$), starting with an operating point with an engine torque ($M_M$) lying above the intake torque ($M_S(n_M)$, $M_M<M_S(n_M)$), and an engine speed ($n_M$) lying below the boost threshold speed ($n_{L\_min}$, ($n_M<n_{L\_min}$)), under a moderate increase of the engine speed ($n_M$), initially the engine torque ($M_M$) is increased up to the intake torque ($M_S(n_M)$) and next, the engine torque ($M_M$) is further increased above the intake torque ($M_S(n_M)$), and the engine speed ($n_M$) at a point in time of the engine torque ($M_M$) exceeding the intake torque ($M_S(n_M)$), is either set as the sought after boost threshold speed ($n_{L\_min}$) or is used for adapting the boost threshold speed ($n_{L\_min}$).

16. The method according to claim 3, further comprising the step of either determining or adapting the boost threshold speed ($n_{L\_min}$) of the internal combustion engine which comprises a boost pressure sensor, in which in an operating situation with a drive resistance torque ($M_{FW}$) lying below the intake torque ($M_S(n_M)$, $M_{FW}<M_S(n_M)$), and a target torque (M) lying above the intake torque ($M_S(n_M)$, $M_{soll}>M_S(n_M)$), starting with an operating point with an engine torque ($M_M$) lying below the intake torque ($M_S(n_M)$, $M_M(t0)<M_S(n_M)$), and an engine speed (nM) lying below the boost threshold speed ($n_{L\_min}$, $n_M(t0)<n_{L\_min}$), under a moderate increase of the engine speed ($n_M$), initially the engine torque ($M_M$) is increased up to the intake torque ($M_S(n_M)$ (t1 to t2)), and subsequently the engine torque ($M_M$) is further increased above the intake torque ($M_S(n_M)$), and the engine speed ($n_M$) at a point in time (t3) of a recorded increase of the boost pressure is either set as the desired boost threshold speed ($n_{L\_min}$) or is used for adapting the boost threshold speed ($n_{L\_min}$).

17. The method according to claim 15, further comprising the step of temporarily deactivated an operating limit that may be present for avoiding a high engine torque ($M_M$) at low engine speed ($n_M$) lying near the idle speed ($n_{idle}$).

* * * * *